United States Patent [19]

Mustarelli et al.

[11] Patent Number: 4,699,228
[45] Date of Patent: Oct. 13, 1987

[54] MASS TRANSDUCER WITH ELECTROMAGNETIC COMPENSATION

[75] Inventors: Piercarlo Mustarelli, Pavia; Franco Lupoli; Emilio Negri, both of Milan, all of Italy

[73] Assignees: Dataprocess S.p.A., Rosate; Italora S.p.A., Rozzano Milanofiori, both of Italy

[21] Appl. No.: 879,014

[22] Filed: Jun. 25, 1986

[30] Foreign Application Priority Data

Jun. 28, 1985 [IT] Italy .................. 21329 A/85

[51] Int. Cl.$^4$ .......................... G01G 7/00; G01G 3/14
[52] U.S. Cl. ........................... 177/212; 177/210 EM
[58] Field of Search ..................... 177/212, 210 EM

[56] References Cited

U.S. PATENT DOCUMENTS 3,322,222  5/1967  Baur ........................ 177/212 X
3,688,854  9/1972  Strobel ..................... 177/212 X
4,337,838  7/1982  Kunz ........................ 177/212

FOREIGN PATENT DOCUMENTS 2013433  8/1979  United Kingdom .
2082776  3/1982  United Kingdom .

Primary Examiner—George H. Miller, Jr.
Attorney, Agent, or Firm—Young & Thompson

[57] ABSTRACT

A new mass transducer with electromagnetic compensation is described, comprising a load-detection part, fitted with a coil fixed to the load levers, a reference part comprising a sample weight and a second coil (called reference coil) fixed to the reference levers, a magnetic unit (yoke) with permanent magnets in the air gap whereof the coils are placed coaxially, free to move independently of one another, a control device for keeping the load coil and the reference coil in place and a device for comparing the current flowing through the coils. According to the invention, the coils are of the flattened toric type, their biggest dimension being perpendicular to the longitudinal axis of the lever arm of the load levers and the winding axis X—X of the coil lined up with the force axis. The magnetic circuit has the form of a wafer formed by two flat magnetic elements facing each other, made integral with a central plate through one or more fastening members, inside which at least one pair of permanent magnets, fitted so as to form two air gaps symmetrical to the central metal body wherein the coils are housed. The magnets are positioned so that each coil is immersed in an equiversal magnetic field, directed perpendicular to its biggest surface.

12 Claims, 13 Drawing Figures

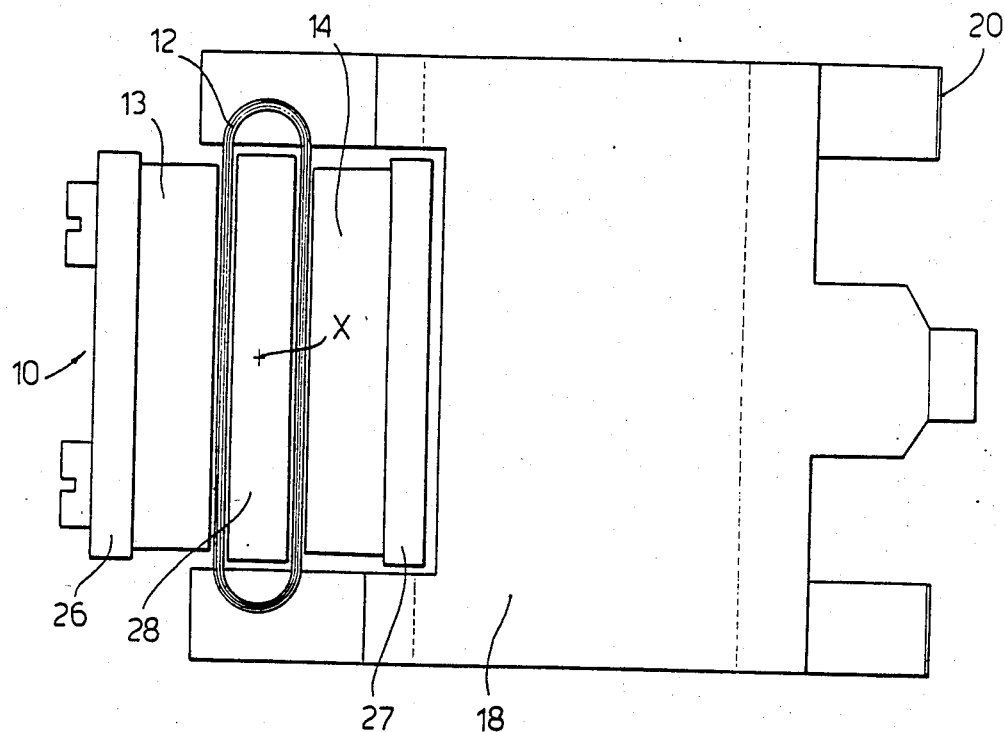
FIG.3
FIG.4
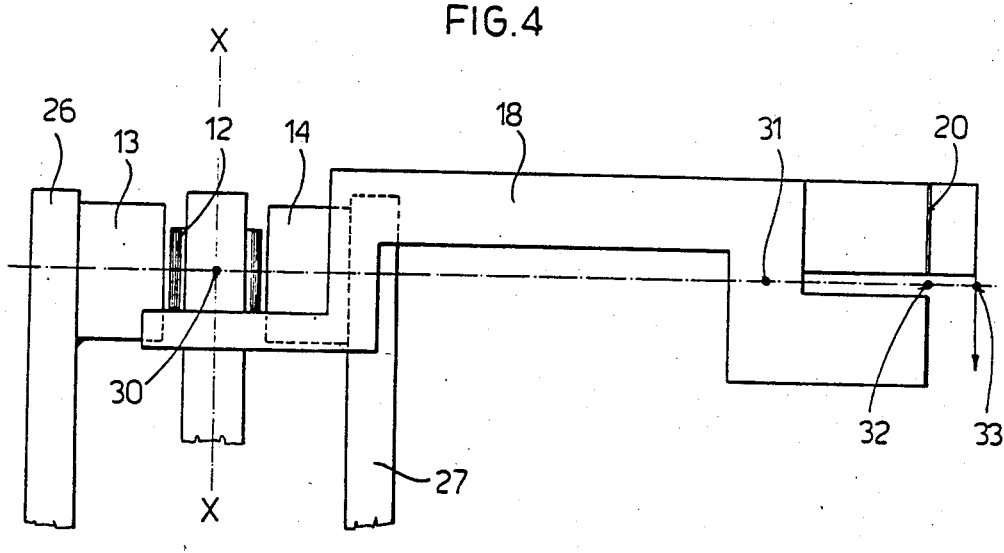

MASS TRANSDUCER WITH ELECTROMAGNETIC COMPENSATION

The present invention refers to a new mass transducer with electromagnetic compensation.

The principle behind the operation of balances with electromagnetic compensation is well-known. In U.S. Pat. No. 3,322,222, for example, the scalepan is connected to a coil positioned in the air gap of a magnetic circuit formed by permanent magnets. Data relative to the load effectively applied can be obtained from the electrical current flowing through the coil, which produces a force perpendicular to the magnetic field of the air gap, said force being suitably adjusted so that the resulting electromagnetic force balances the force exerted on the scalepan.

This measurement may be invalidated by various factors, among which variation of the effective magnetic field in the air gap, possible temperature drifting of the electronic circuit, accidental displacement of mechanical parts and so on.

Patent application GB-A-2,013,433 is also known. Here the magnetic unit is formed by an external magnet and by an internal core the two ends of which are connected with the external magnet by means of two air gaps, a mobile coil being inserted in each of them. One of the two coils is connected to the unknown weight, the other with the sample weight; electronic circuits compare the two currents necessary to keep both coils balanced and process these data giving an indication of the unknown load.

This system gives rise to structural problems because the core needs to be centered in respect to the external permanent magnet. Also the fastening of the core once centered is difficult, as this fastening has to be carried out at the external magnet. Finally the force generated by the coils operate in their center. Thus to establish a counter balancing moment, a high current has to flow in each coil—and this would cause an unwanted heating of all the balance—or it is necessary to foresee sizable overall dimensions for all this group. Its dimension depends in fact not only from the distance existing between the center of the coil and the fulcrum around which the lever rotates, but also from the distance between the periphery and the center of the coil, i.e. from the coil radius.

Patent application GB-A-2,082,776 has tried to solve at least the mechanical and structural problems specified above by foreseeing a sandwich shaped external magnet and core having thus flat air gaps. Moreover the turns of the coils are placed in such a way to contribute only partially in generating the required force. This leads to a limited efficiency of the system, consequently to an unwanted overheating of the balance.

Therefore, the object of this invention is to provide a mass transducer with electromagnetic compensation which has more simply constructed air gaps and coil-supporting means, reduced overall dimensions, allows at least 90% of the coil's total length to be used and through which low currents pass, thereby producing little heat.

A further object is to diminish or to eliminate the variations in the weighing due to external causes such as room temperature, etc.

The object is achieved by providing, in a device of the type described above, for the coils to be of the flattened toric type with their biggest dimension perpendicular to the longitudinal axis of the lever arm and their winding axis coincident with the coil force; whereas the magnetic circuit has the form of a wafer composed of two flat magnetic elements facing each other, made integral with a central plate through one or more intermediary transmission members, and at least one pair of permanent magnets is fitted inside the plate, in such a way as to form two air gaps symmetrical to the central metal body wherein the two coils are housed. According to the invention the magnet polarities are oriented in such a way that the coils are immersed in an equiversal magnetic field, directed perpendicular to their biggest surface.

According to a feature of this invention, the value of the currents is obtained by measuring the voltage drops at the ends of the two insulated wires of known resistance in thermal contact, said contact being achieved by tightly plaiting the two wires together and winding the coil on a suitable support.

A further characteristic of this invention provides for the coils to be fixed to relative levers in such a way that the point at which the electromagnetic-compensating force is applied, the barycenter of the lever, the fulcrum and the point at which the load is applied are co-linear.

Further advantageous features of this invention are clearly apparent in the exemplary embodiment described below, with reference to the accompanying drawings, wherein:

FIG. 3 shows a top plan view of the transducer part connected to the load to be measured;

FIG. 4 shows a constructional detail of the transmission levers;

Figure 10:
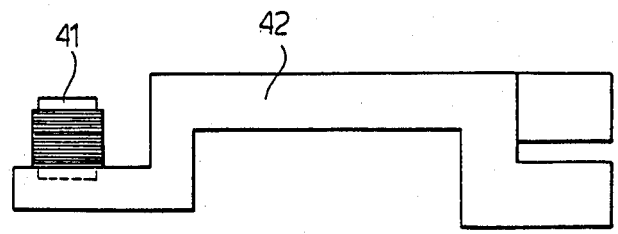
Figure 11:
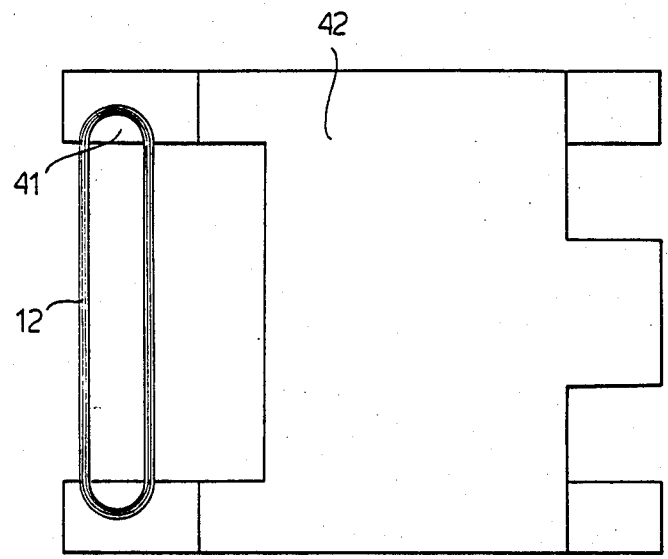
Figure 12:
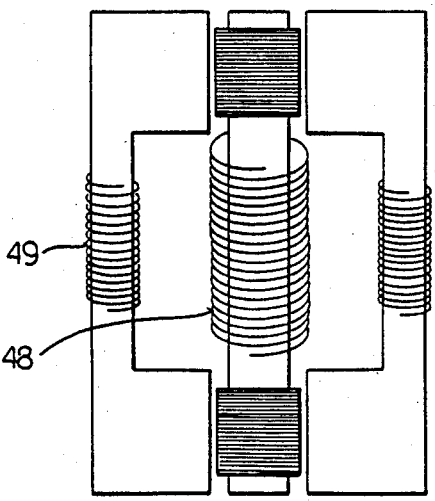
Figure 13:
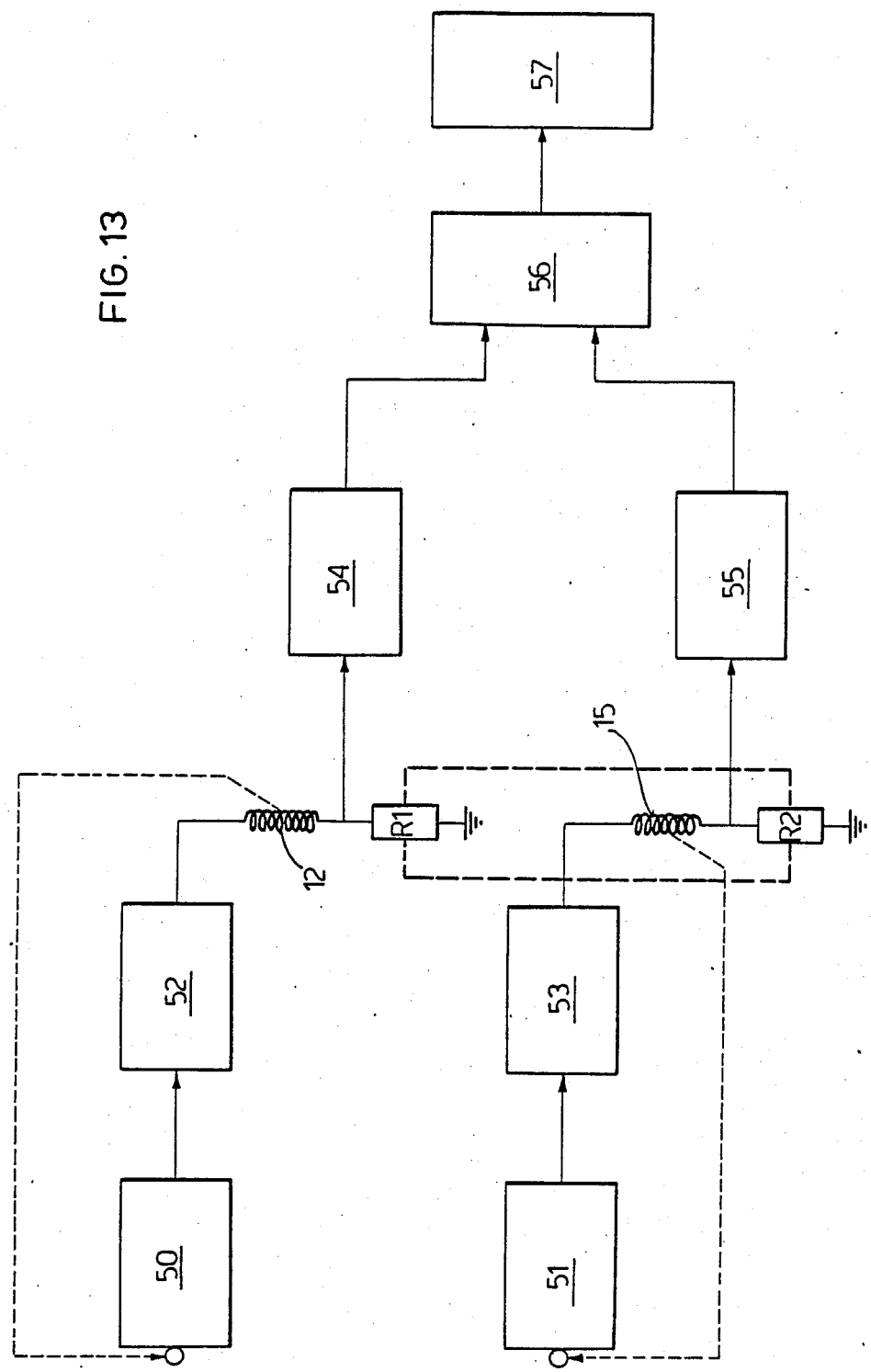

FIGS. 10 and 11 relate to a possible embodiment of the levers and coils;

FIG. 12 shows a variation of the magnetic circuit;

FIG. 13 is a logic diagram of how the transducer operates.

Figure 1:
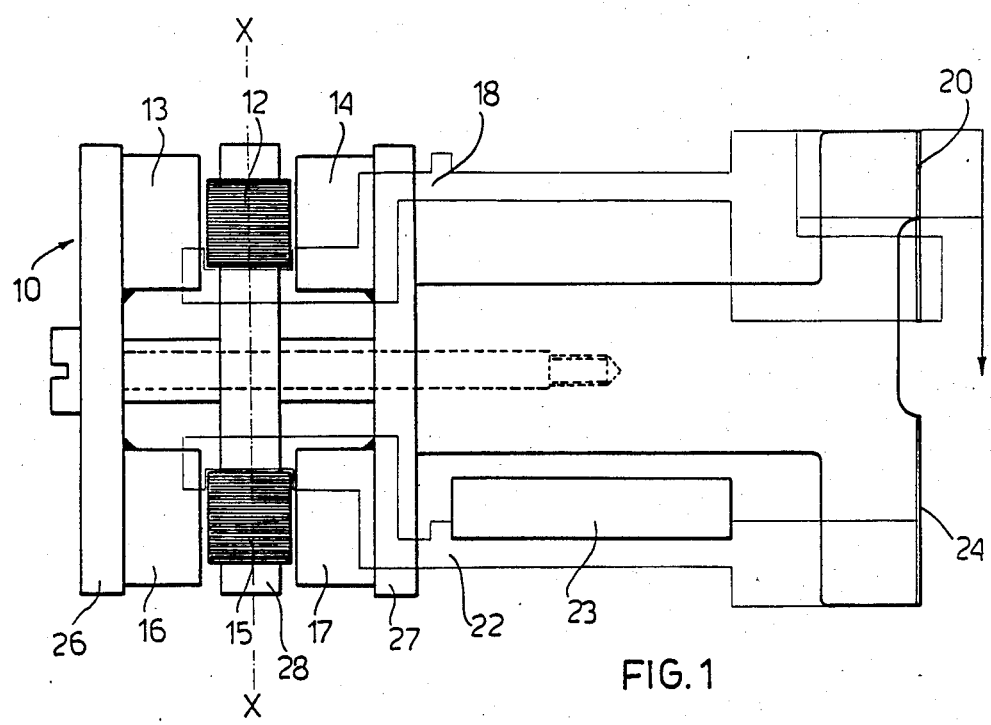
FIG. 1 shows a view of the device according to the invention.
Figure 2:
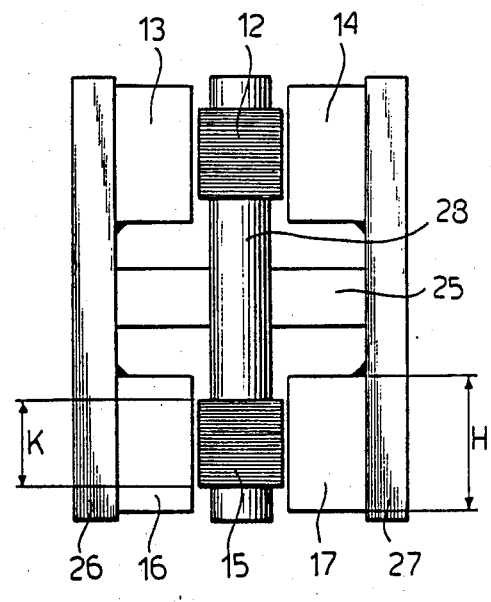
FIG. 2 shows an exemplary embodiment of a constructional detail of the transducer.

Referring to FIG. 1, a description is given herein of the transducer 10. It comprises a load-measuring coil 12 placed between magnets 13 and 14. The device also comprises a reference coil 15 placed between magnets 16 and 17. To said coil 12 is connected the load lever 18 which has its fulcrum at the lamina 20. The reference lever 22, with its fulcrum at the lamina 24, is connected to the reference coil 15. The reference mass 23 is fixed to the reference lever 22. As can be seen in FIGS. 2 and 3, the coil 12 is of the flattened toric type with its biggest dimension perpendicular to the longitudinal axis of the lever arm 18 which is supporting it, the winding axis X—X of the coil being in the same direction as that of the lever movement and of the coil force. The coil 15 also has a similar configuration. The magnetic circuit is in the form of a wafer composed of two flat magnetic elements facing each other, 26 and 27 respectively, and made integral with the central plate 28 through one or more fastening members 25. Two pairs of permanent magnets, 16–17 and 13–14 respectively, are placed against the inner wall of the lateral plates. Said magnets are fitted in such a way as to form two air gaps symmetrical to the central metal body 28 wherein the coils 12 and 15 are housed, and arranged so that each coil is immersed in an equiversal magnetic field, directed perpendicular to its biggest surface (see also Fig. 9 in which each coil is placed in two identical North-South magnetic fields). Magnetic fluxes are thus formed which pass through the coils in such a way that their possible variation due to external causes produces equal effects on both coils.

According to the embodiment shown in FIG. 4, the coils are fixed to the respective levers in such a way that the point 30 at which the electromagnetic-compensating force is applied, the barycenter of the lever 31, the fulcrum 32 and the point 33 at which the weight is applied are co-linear.

Figure 5:
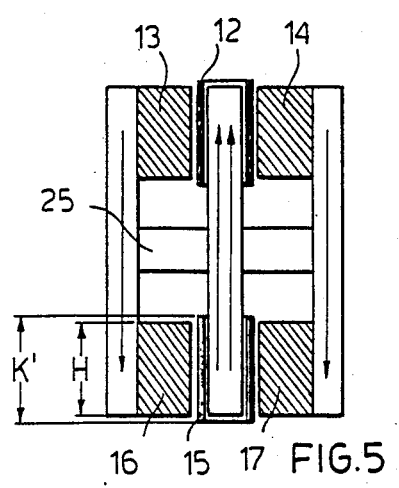
FIG. 5 is a cross-section of a variation of the magnetic circuit.

Special attention is paid to the dimensions of the coils. FIG. 2 shows coils 12 and 15 with a height K which is about 75% of the height H of the magnets (between 70% and 80%), so that said coils can operate in an area of the magnetic field of maximum uniformity. FIG. 5 shows a constructional variation of the coils 12 and 15 wherein the height K' is about 20-30% greater than the height H of the magnets, in order to improve efficiency and make said coils independent of the equilibrium point.

Figure 6:
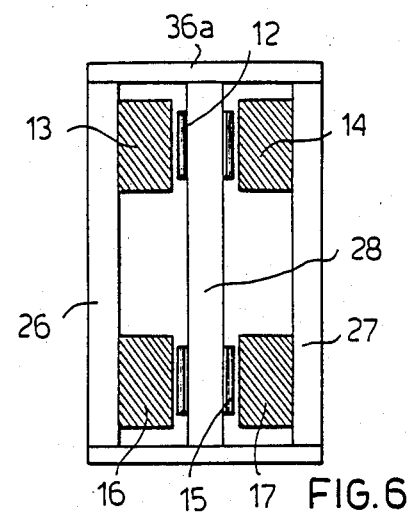
FIG. 6 represents a possible embodiment of the magnetic circuit.

FIG. 6 shows an embodiment wherein the flat magnetic elements 26 and 27, and the central plate 28, extend beyond the edges of the permanent magnets to form guides for the positioning of a magnetic circuit-shielding device 36a.

Figure 7:
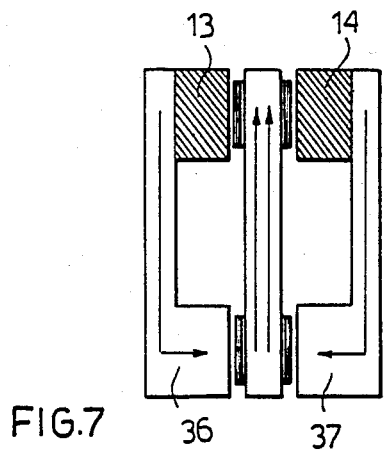
FIGS. 7, 8 and 9 show examples of possible variations in the embodiment of the magnetic circuit.

FIG. 7 represents an exemplary embodiment according to which the magnetic circuit has only one pair of magnets, while the flat magnetic elements 36 and 37 are given a suitable shape.

Figure 8:
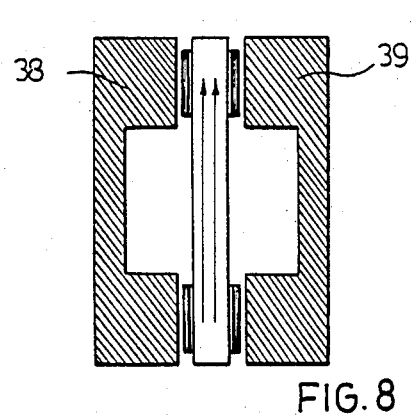

FIG. 8 is another embodiment in which horseshoe magnets 38 and 39 are used.

Figure 9:
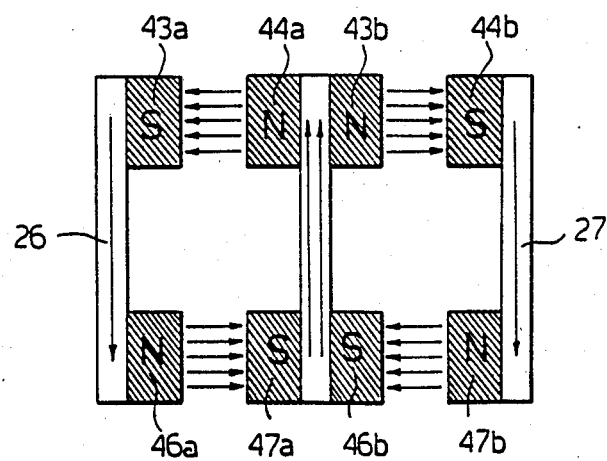

FIG. 9 shows a variation in which four pairs of permanent magnets 43a S 44a N 46a N 47a S 43b N 44b S 46b S 47b N are used.

According to one variation, the transmission members arranged in the wafer are made of a nonmagnetic material, or even a magnetic material, in order to compensate for the effects of temperature.

FIGS. 11 and 12 show a variation in the construction of the coils: they may be wound on pins 41 made in the body of lever 42 itself.

FIG. 12 relates to a possible embodiment wherein the magnetic field is not generated by permanent magnets, but by one or more suitably arranged electrical windings 48.

One or more additional electrical windings 49 to keep the value of magnetic induction in the air gaps constant may be provided on the central plate or on the flat magnetic elements.

FIG. 13 shows a block diagram of how the transducer operates electrically.

According to the invention, the ratio of the currents flowing through the coils 12 and 15 is obtained by measuring the ratio between the voltage drops at resistors R1 and R2, through which said currents pass. These currents are regulated by control devices 52 and 53 on the basis of signals from the position sensors 50 and 51.

The voltage signals at the ends of resistors R1 and R2 are then amplified by the devices 54 and 55 and sent as input to an A/D converter 56, which computes said ratio. The result is given as an input to the display device 57.

In order to achieve a reliable measurement, the value for the resistors R1 and R2, or at least the ratio between them, must remain stable, while the temperature varies. For this purpose said resistors are coupled thermically: an insulated constantan wire is used to form a plait. Said plait is wound on a suitable support. In this way the difference in temperature between the wires making up the two resistors is made negligible.

What we claim is:

1. Mass transducer with electromagnetic compensation comprising a magnetic unit formed by an external magnet and by an internal core with two ends, said two ends being connected with the external magnet by means of two air gaps, a mobile coil being inserted in each of said air gaps; one coil being connected to an unknown weight, the other to a sample weight; also comprising an electronic circuit which compares the two currents necessary for balancing both coils, wherein
   (a) the magnetic unit is a sandwich made up of flat magnetic elements facing each other between which pairs of permanent magnets forming two flat air gaps are comprised;
   (b) that each coil is substantially flat and has windings that extend straight for the greater part of their length in the pairs of flat air gaps; while only a short length H of its turns is used for linking the wires which extend to the other air gap forming the pair;
   (c) that the winding axis (X-X) of each coil coincides with the direction of the force generated by said coil and is perpendicular to the straight portions of the windings.

2. A transducer according to claim 1, wherein the values of the currents are obtained by measuring the voltage drops at the ends of two insulated wires of known resistance in thermal contact, said contact being achieved by plaiting the wires together and winding the coil on a suitable support.

3. A transducer according to claim 1, wherein the coils are directly connected to a lever connected to a said weight by being wound on two pins made therein.

4. A transducer according to claim 3, wherein the point at which the electromagnetic-compensating force is applied, the barycenter and the fulcrum of the lever, and the point at which the load is applied are co-linear.

5. A transducer according to claim 1, wherein the height of the coils is at least 20-30% greater than the height of the magnets.

6. A transducer according to claim 1, wherein the height of the coils is at least 20-30% less than the height of the magnets.

7. A transducer according to claim 1, wherein the flat magnetic elements of the magnetic circuit are made up of horseshoe magnets.

8. A transducer according to claim 1, wherein the edges of the flat magnetic elements and of the central plate extend beyond the edge of the permanent magnets, which form guides for positioning a magnetic circuit-shielding device.

9. A transducer according to claim 1, wherein the intermediary transmission members are made of a magnetic material.

10. A transducer according to claim 1, characterized in that the intermediary transmission members are made of a nonmagnetic material.

11. A transducer according to claim 1, wherein the magnetic field is generated by two pairs of permanent magnets fixed to the flat magnetic elements.

12. A transducer according to claim 1, wherein it has at least one additional electric winding on the central plate or on a flat magnetic element to keep constant the value of magnetic induction in the air gaps.

* * * * *